United States Patent [19]

Ferris et al.

[11] 4,235,570
[45] Nov. 25, 1980

[54] ELASTOMERIC HELICOPTER ROTOR LOAD REACTION SYSTEM

[75] Inventors: Donald L. Ferris, Newtown; Edward S. Hibyan, Trumbull; Robert L. Faiz, Newtown, all of Conn.

[73] Assignee: United Technologies Corporation, Hartford, Conn.

[21] Appl. No.: 919,357

[22] Filed: Jun. 26, 1978

[51] Int. Cl.² ............... B64C 11/06; B64C 27/38
[52] U.S. Cl. .................... 416/134 A; 416/140; 416/141
[58] Field of Search ............ 416/106, 107, 134 A, 416/140 R, 140 A, 141

[56] References Cited
U.S. PATENT DOCUMENTS

| | | | |
|---|---|---|---|
| 3,282,350 | 11/1966 | Kisovec | 416/140 |
| 3,591,310 | 7/1971 | Mouille | 416/140 A |
| 3,862,812 | 1/1975 | Gorndt et al. | 416/141 |
| 4,028,001 | 6/1977 | Watson | 416/134 A |
| 4,141,664 | 2/1979 | Moran et al. | 416/134 A |

Primary Examiner—John J. Vrablik
Attorney, Agent, or Firm—Vernon F. Hauschild

[57] ABSTRACT

A helicopter rotor having one or more blades mounted for rotation with the rotor hub and each supported therefrom by an elastomeric bearing, and having a lead-lag damper connected to the blade and the hub and extending substantially parallel to the blade axis, and including the improvement of apparatus for preventing tension loading of the elastomeric bearing as the blade moves radially inwardly as a result of rotor braking.

2 Claims, 7 Drawing Figures

ELASTOMERIC HELICOPTER ROTOR LOAD REACTION SYSTEM

BACKGROUND OF THE INVENTION

This invention relates to helicopter rotor heads of the elastomeric type wherein the rotor blades are connected to the rotor hub through one or more elastomeric type bearings. Such a rotor head is illustrated in U.S. Pat. No. 3,782,854. The function of the elastomeric bearings in this rotor head application is to provide rotor blade retention and support while allowing the blade freedom in torsion as well as in vertical and horizontal directions to a limited degree and within the shear capabilities of the bearings. These bearings are laminated structures comprising alternating layers of metal plates and elastomer. A concern of the rotor head designer is to provide adequate structural restraint for the large in-plane rotor blade motions which occur during rotor head starting and stopping operations, where the inertia and momentum of the blades tend to cause or allow them to move to lead or lag positions beyond their generally radial flight position. When a rotor head is started and being brought up to its full rotational speed, the blades tend to lag behind the rotor hub at a small angle until equilibrium is achieved. Similarly, when stopping under the speed retardation of a rotor brake, the blades have a tendency to pivot about their focal points and to advance into lead positions relative to the hub. By the configuration shown in U.S. Pat. No. 3,759,632, the in-plane damper is connected to the root end of the blade, and its stroke is substantially in a perpendicular direction to the blade feathering axis. Small angular excursions of a blade relative to the rotor hub in either the lead or lag direction will be damped by this configuration, and large excursions beyond a predetermined angle will be reacted by the interaction of the damper bottoming and the shaft/hub arm contacts perpendicular to the blade axis. This perpendicular relationship between the blade and damper resulted in a high side load being imposed on the shear bearing located between the elastomeric bearings and the blade spar root end. While a reorientation of the damper to place its axis generally parallel to that of the blade span axis effectively lowers that high load, such reorientation could not be made without addressing and solving the need to react the inwardly directed load that occurs when the blade moves to its lead position as caused by the application of the rotor brake when the rotor is still rotating. The problem caused by the inwardly directed load is its tendency to introduce a tension load into the elastomeric bearings at a time when the normally high compressive flight load on the bearings is reduced in proportion to the square of the rotor speed.

SUMMARY OF THE INVENTION

This invention addresses both the general problem associated with elastomeric bearings and inherent with rubber type products, namely that tension loads to any significant degree are intolerable, and the very specific problem of reacting certain rotor blade loads in an elastomeric rotor head configuration wherein side loads imposed on the shear bearing are minimized by positioning the blade damper to stroke in a direction substantially parallel with the blade feathering axis. It is recognized that blade motion in one direction (e.g. a lag motion) will result in application of a compressive load on the elastomeric bearings as the lag stop is contacted. Such loading may be accommodated. A blade excursion in the other direction (e.g. a lead motion) will bottom the damper and would result in a tension load being imposed on the bearings. While elastomeric bearings are capable of withstanding large compressive loads, such bearings are capable of sustaining only slight tension loads before rupture occurs. It is an object of this invention to provide means in our elastomeric rotor head to restrict significant tension loads from being imposed on these rotor hub bearings. It is recognized in this invention that a consistent pattern will exist in the path or locus that the rotor blade will take upon stopping, and that at the time of concern for reacting the brake loading, the blade will be positioned at approximately a three degree lead angle and a one half degree droop angle to the axis of the elastomeric blade support bearing. A stop ring, which also serves as a droop stop ring, is mounted on the blade root in the vicinity of the outer portion of the rotor hub arm. By the addition of a selectively shaped and positioned pad or bumper to the outer facing portion of the hub arm and on the lead side of the blade, and by selectively configuring the inner facing surface of the stop ring, proper dimensioning of these elements can result in their programmed contact to react the braking loads in conjunction with a lead stop in the blade damper regardless of the blade pitch setting. This function will not interfere with the normal blade vertical restraining function of the droop stop and droop stop ring as shown in U.S. Pat. No. 3,853,426. Use of this invention in reacting inward loads has allowed us to accommodate a rotor brake and to reduce the tension loading on the shear bearing, and to maintain use of the damper for the dual functions of blade motion damping and in-plane load reaction.

BRIEF DESCRIPTION OF THE DRAWINGS

FIG. 3A is an end view of one of the hub arms with the blade omitted for clarity, showing the partial cylindrical pad with its spherically shaped surface and the location of the contacting spherical surface of the droop stop ring.

DESCRIPTION OF THE INVENTION

Figure 1:
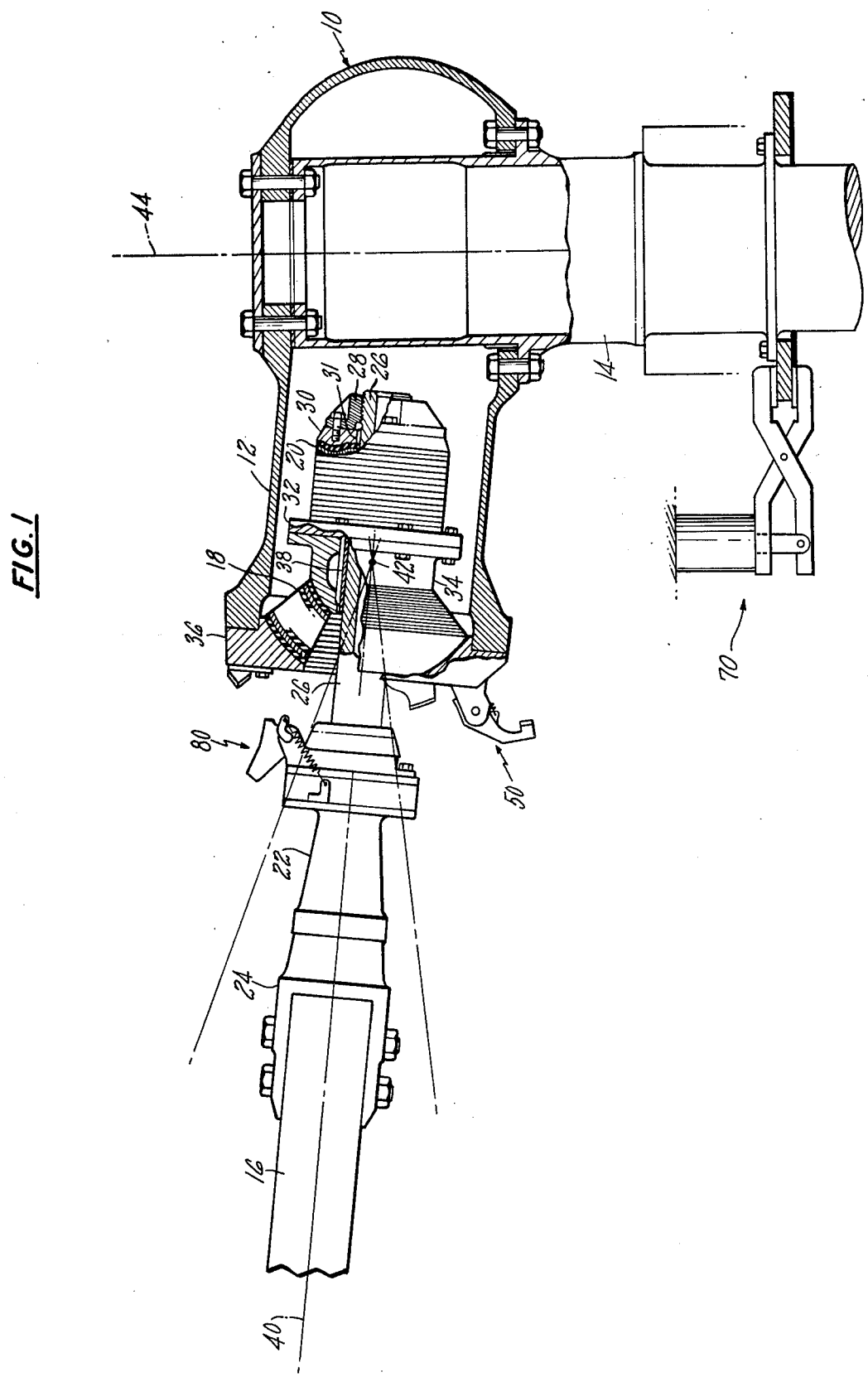
FIG. 1 is a side view, partially in cross section of an elastomeric rotor helicopter, showing one of the hub arms and a root end connection for a blade, and incorporating the teachings of this invention.

The typical Sikorsky type elastomeric helicopter rotor is depicted in FIG. 1 wherein hub 10 includes a plurality of hub arms 12, one of which is shown, and which hub 10 is bolted to the upstanding drive shaft 14. A rotor blade 16 is mounted to each hub arm 12 for full articulation in pitch change, droop, flap, lead and lag.

The primary mount is an elastomeric bearing array preferably consisting of spherical bearing 18 and thrust bearing 20. Blade 16 is attached to the inner end of thrust bearing 20 by means of cuff attachment 22 which is bolted to the blade root by its bifurcated arms 24. The inner end of attachment 22 forms stub shaft 26, which passes through the center of the bearing array, and is threaded at its inner end.

Figure 2:
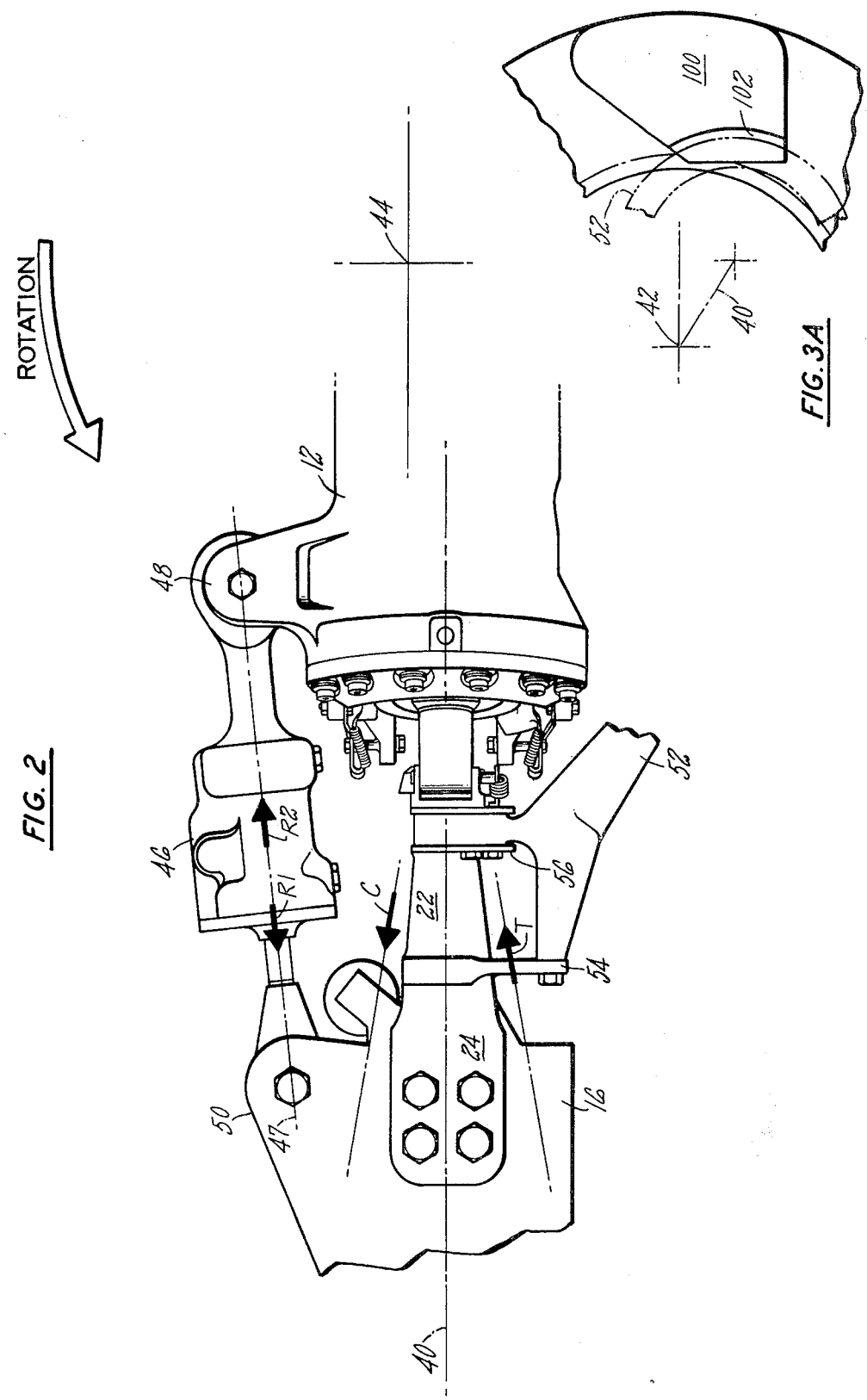
FIG. 2 is a top view of the rotor head of FIG. 1, illustrating the same hub arm and blade connection, and showing the damper connected between the hub and blade.

Nut 28 forms a shoulder for the shaft to restrain bearing 20. Race 30 of bearing 20 is mounted to the shaft 26 by a spline connection 31. The outer race 32 of bearing 20 is connected to the inner race 34 of spherical bearing 18. Outer race 36 of bearing 18 is bolted to the external end face of cylindrical hub arm 12. A journal bearing 38 is positioned between race member 34 and the blade shaft 26 to accommodate shear loading. With the blade thus attached to the bearing array, the centrifugal force created by rotor blade rotation will impose compressive loading on the bearings 18 and 20. These bearings are of the typical laminated elastomeric construction designed to react high compressive loads while allowing limited motion in shear. As more particularly described in U.S. Pat. No. 3,782,854 bearings 18 and 20 share operational blade motions as the blade changes in pitch by its rotation about blade feathering axis 40. During flight, each blade will make excursions upward and downward as a function of the instant loading on that particular blade, which is related to the aircraft maneuver being performed, its gross weight, air density, etc. The focal point 42 for blade articulation lies on axis 40 and comprises the center of spherical bearing 18. Under a full operative compressive load, this focal point 42 will shift outward a slight amount as the elastomer laminates of both bearings are compressed. As indicated in FIG. 1, mechanical stops 80 and 50 are used to limit flap and droop angles to predetermined maximums, in both flight and static conditions. Similarly, while designed to operate at a specific angular relationship with the hub arm axis 40 (see FIG. 2) each blade will also make in-plane excursions and will occasionally lag behind or lead ahead of its operational position by as much as ten degrees under certain conditions; namely when starting and when braking. With reference still to FIG. 2, these angles of maximum lead or lag are illustrated for the counterclockwise rotation of the rotor head about axis 44. Such in-plane blade motion is moderated by linear damper 46, which is oriented to stroke along its axis 47 in a direction generally parallel to blade axis 40. The inner end of damper 46 is connected by a spherical rod end bearing to hub arm 12 by means of flange 48, while its outer end is connected by means of a similar bearing to the root end of blade 16 at its trailing edge 50. FIG. 2 also illustrates the control horn 52, by which pitch change inputs are made to blade 16. Horn 52 attaches to cuff attachment 22 at flanges 54 and 56.

Turning back to FIG. 1, attention is directed to the static or on-ground, requirements to limit the blade motions in flap and droop to very small angles. The usual concern in this regard is to prevent excessive blade motions that would otherwise result in a blade contacting the ground or a part of the aircraft fuselage, as might be caused by excessive wind loads. Droop stop mechanisms used heretofore for elastomeric type rotors have followed the teaching of my U.S. Pat. No. 3,778,189 and more specifically U.S. Pat. No. 3,853,426 to Rybicki. Reference is made to U.S. Pat. No. 2,906,348 to J. Lovegrove for a general showing of an anti-flapping device.

Figure 4:
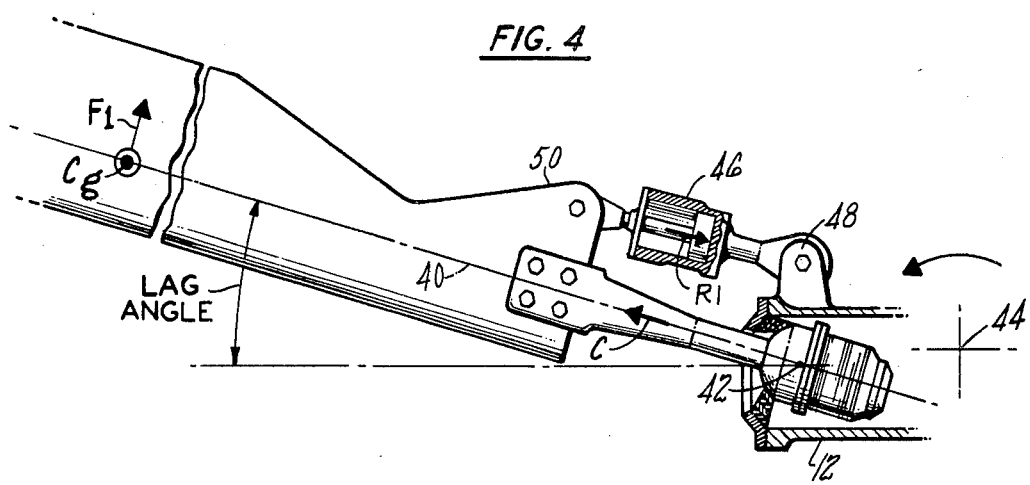
FIG. 4 is a showing of the blade and damper during rotor starting, illustrating the applicable forces.
Figure 5:
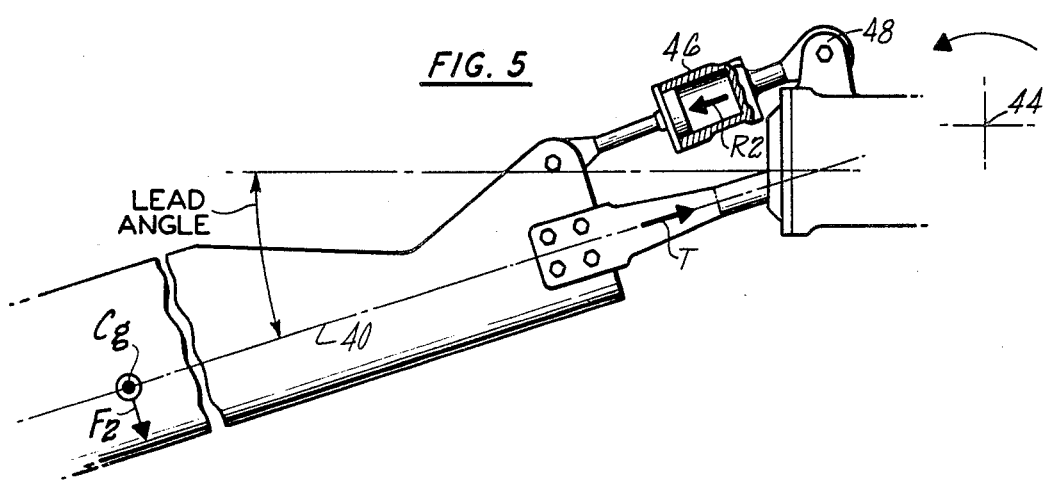
FIG. 5 is a showing of the blade and damper during rotor braking, also illustrating the applicable forces.

Before proceeding further to describe the specific teaching and configuration of this invention, it is important to realize that the teaching of U.S. Pat. No. 3,759,632 which addresses in-plane excursions of the blade and provides means to react the resultant loads from excursions in either the lead or lag directions, is not adequate in the rotor head embodiment of FIGS. 1 and 2, due to the different orientation of the damper. In U.S. Pat. No. 3,759,632, the damper axis is oriented perpendicular to the blade axis, and reaction loads of starting or braking are similarly oriented and reacted on opposite sides of the elastomeric bearing array by the damper and the contact edges of the hub arms, as described in that patent. As an improvement to minimize the shear loads on the journal or shear bearing 38, the damper 46 orientation is repositioned from the perpendicular orientation to the blade stub shaft 26 as illustrated in the patents referenced above, to the parallel orientation shown in FIG. 2. FIG. 4 illustrates the action of rotor starting; wherein rotation is counterclockwise and the damper 46 is connected between the hub flange 48 and the blade trailing edge 50. With the blades at rest, acceleration of the rotor hub produces an inertia force $F_1$ in each blade acting at its Cg about the focal point 42 of the main bearing 18 which causes the blade to lag in a clockwise direction behind its otherwise radial position. As the lag angle increases, the damper 46 collapses, and its piston is driven toward the inner cylinder wall. Upon bottoming of the damper piston, further lag motion is mechanically restricted, and an inward force as expressed by vector R1 is imposed on the damper and hub attachment 48. An equal and oppositely directed reaction load is imposed outwardly along the blade axis 40, which load is depicted by vector C. Such outwardly directed load introduces a compressive force on the bearings 18 and 20, which force is additive to the compressive load being generated on the bearings due to the centrifugal force developed by blade rotation. The bearings are inherently able to sustain such combined compressive loadings. In-plane blade motion in the other direction however, as from the operation of blade braking may result in an adverse condition, depending on the magnitude of the oppositely directed forces. The advantages of a reduced load on the shear bearing and the quicker rotor stopping capability offered by use of a rotor brake are available, once this adverse condition can be accommodated. A typical rotor brake installation 70 is depicted in U.S. Pat. No. 3,380,564 to Beurer, and FIG. 5 illustrates the action of rotor stopping. Application of the rotor brake to the rotor hub, as the blades continue to rotate counterclockwise under their own inertia, produces an inertia force $F_2$ in each blade acting at its Cg about the blade focal point 42 of bearing 18. The blade lead angle increases as the damper 46 extends to the end of its stroke. When fully extended, further lead motion of the blade is prevented, and an outward force as expressed by vector R2 is imposed on the damper hub attachment 48. Likewise, an equal and oppositely directed reaction load is imposed inwardly along blade axis 40, which load is depicted by vector T. This load is expected to be in the order of 6,000 lbs. for the S-70 model helicopter, which has a max gross weight of 20,000 lbs. The usual centrifugal force generated by blade rotation and acting on each blade is expected to be about 70,000 lbs. at full operational speed. Of course, the rotor brake is not applied to the rotor head when it is being driven, nor when it is at or near full RPM. However, in order to bring the rotor to a stop in a short time, as may be desired in the case of a shipboard landing, the rotor brake will be applied shortly after power is removed from the rotor, such as when its rotational speed has decayed to about 60-76%. With the rapid decay of the centrifugally generated force, and the presence of the oppositely directed reactive load T, there will come a time when the summation of the two is a resultant inward directed force. If allowed to reach the bearings 18 and 20, this inward force could place the bearings in tension, and effect a rupture in either or both bearings.

Figure 6:
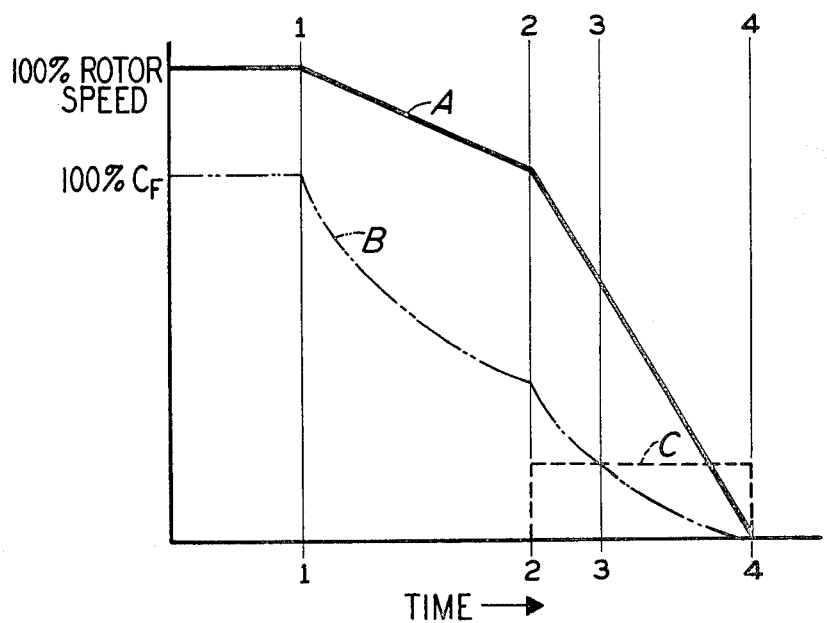
FIG. 6 graphically depicts the time phased relationship between rotor RPM, blade centrifugal force, and rotor brake reaction force during a typical rotor stop, as the rotor brake is applied.

Since it is important to fully understand this possible adverse relationship, FIG. 6 has been prepared to depict these oppositely directed loads and forces imposed on the blades, plotted against time. Since FIG. 6 is illustrative of the effects of rotor stopping only, the ordinate represents a point in time when the helicopter rotor is operating at full speed, while the craft has just landed and the pilot is intending to park and shut down. As time is advanced toward this objective, ordinates 1 through 4 indicate respectively the points in time when: (1) power is withdrawn as by the shut-down of the engine; (2) the rotor brake is applied; (3) the critical point is reached when the centrifugal force is equalized by the oppositely directed brake reaction load; and (4) the rotor comes to a complete stop.

Curve A depicts rotor speed over the course of points 1 through 4 where percent of speed is plotted against time. Until time point #1, the rotor speed is constant and starts to decay at this point somewhat slowly thereafter to about a 60-75% level until point #2 when the brake is applied. Upon the application of the brake, rotor speed decreases more abruptly to zero at point #4.

Curve B depicts the decrease of rotor blade centrifugal force as percent of such force is plotted against time. From a full 100 percent value at rotor operational speed, and as a function of decaying rotor speed, decreases in centrifugal force rates occur at points #1 and 2, and the generated force continues to decrease until the rotor speed becomes zero.

Curve C depicts the torque load on each rotor blade which is introduced at point #2 upon the application of the rotor brake.

When the rotor brake is applied at point #2 on FIG. 6, a torque load is produced which decelerates the rotor. The blade inertia force $F_2$ as depicted on FIG. 5 causes the blade to continue to move in the same rotary direction ahead of the slowing rotor hub as the blade pivots about its focal point 42. When the blade reaches its maximum lead angle and damper 46 is extended to its fullest, force $R_2$ is imposed on the damper and reaction load T is imposed on the blade. This reaction load T, as depicted as Curve C in FIG. 6 is inwardly directed, and is substantially constant in magnitude until the rotor is stopped. Point #3 on FIG. 6 identifies the critical point in time when the decaying centrifugal force of curve B acting outward on each blade, is exactly opposed by the substantially constant and inwardly directed brake reaction force of curve C. With curves B and C superimposed as shown, it becomes apparent that from point #3 to point #4 the adverse condition of an inward force upon the elastomeric bearings can occur.

A major teaching of this invention is the provision of means, compatible with both the respective dynamic and static blade excursion freedom and restriction requirements, which will prevent such intolerable tension force from being applied to either bearing. Reference is repeated to U.S. Pat. No. 3,853,426 pertaining to a droop stop for an elastomeric bearing type helicopter rotor. Droop stop 50, as depicted in FIG. 1 herein is similar to that as shown in FIG. 8 of the U.S. Pat. No. 3,853,426. Likewise, anti-flap stop 80, as depicted in FIG. 1 provides the function indicated in that patent.

Figure 3:
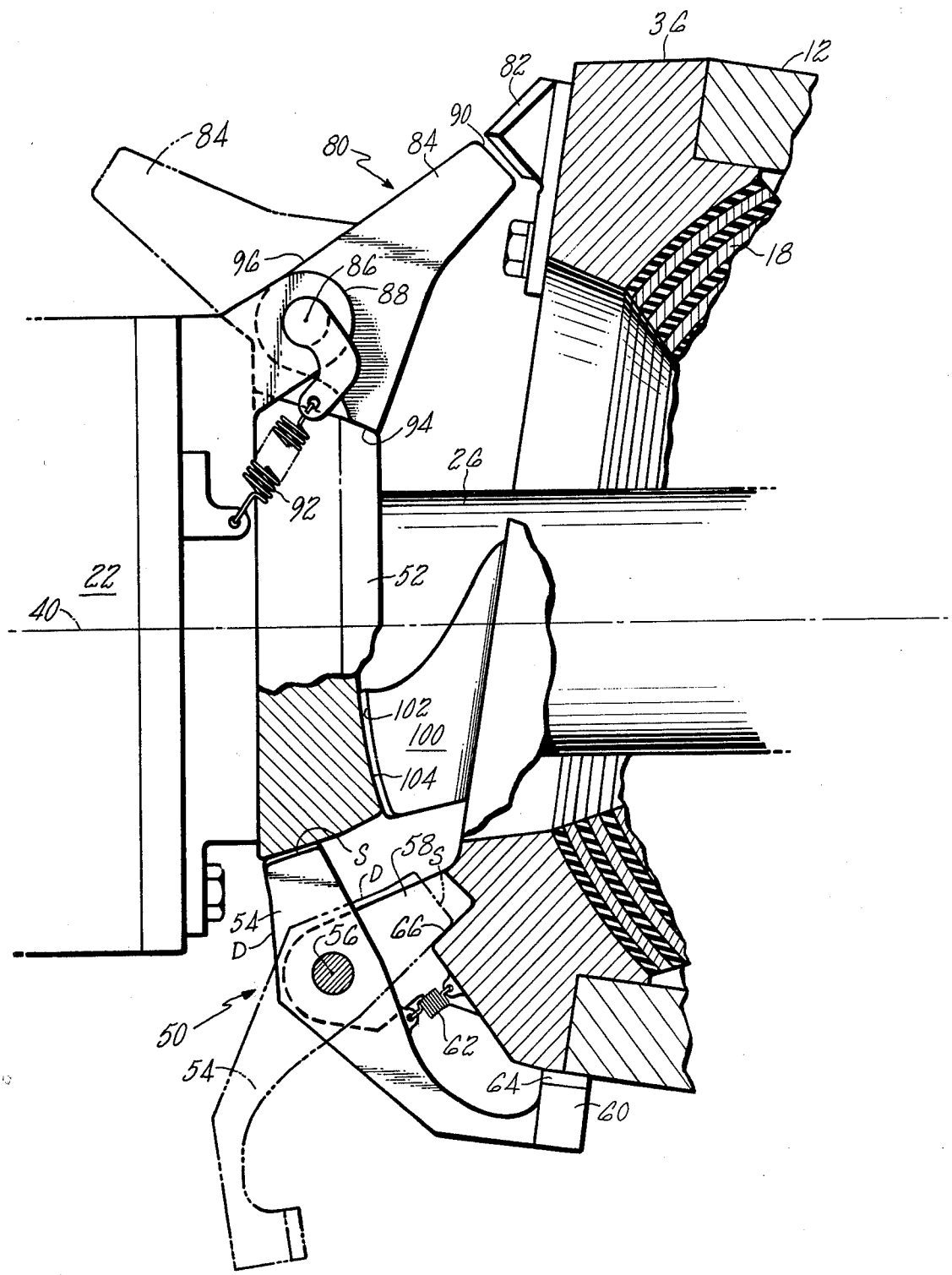
FIG. 3 is a view of a portion of FIG. 1, shown on a larger scale, with the inward load vector indicated.

FIG. 3 illustrates the droop stop 50 mechanism and anti-flap stop member 80 in their static positions, wherein they perform their accustomed functions respectively of limiting droop and flap of the blade, as follows: As shown, rotatable collar 52 is in contact with static surface "S" of stop member 54, which pivots about axis 56 and is supported from bifurcated bracket 58, either integral with or connected to race 36. A second surface "D" on stop member 54 is provided to contact the collar 52 under flight or dynamic conditions. The phantom lines depict the location of surfaces "S" and "D" in flight, wherein stop member 54 has rotated clockwise under the centrifugal force influence of weight 60, opposing return spring 62. Bumper 64 limits the counterclockwise motion of stop member 54 while shoulder 66 limits its clockwise motion. Both the bumper 64 and shoulder 66 are configured to strike a portion of the fixed bracket 58. Droop stop rotation is in the same direction as stipulated in U.S. Pat. No 3,853,426.

Anti-flap stop 80 is configured to provide its usual function to limit upward blade motion. Pad 82 is fixed to bearing race 36, and may serve as a dynamic stop to be contacted by rotatable collar 52. Anti-flap stop 80 comprises stop member 84, pivotable about axis 86 and is supported by bifurcated bracket 88 which is either integral with or is connected to blade cuff 22. As shown, the end portion 90 of stop member 84 contacts pad 82, under the urging of spring 92. Bumper 94 limits the clockwise motion of stop 84 in contacting the collar 52, while surface 96 limits its counterclockwise motion in contacting an abutment on cuff 22.

Earlier it was explained in connection with the force vectors illustrated on FIG. 5, that it was important to address the possibility as rotor speed decreases that a tension load "T" could be imposed on each rotor blade which at a point in time may be larger in magnitude than the centrifugal force directed oppositely. To preclude this full tension load from being imposed on either or both of the bearings 18 and 20, we have attached a spherical shaped pad 100 to the outboard face of bearing race 36. While such pad member 100 may be shaped in the form of a full circular ring if desired, our embodiment is limited for weight saving considerations to a segment of about 10°, which necessitates that the pad be positioned quite precisely on its support. Since it can be established that the slowing rotor blade will usually assume an angular relationship of three degrees in the lead direction and one-half a degree in the droop direction from the fixed axis 40 of its hub support arm 12 the midpoint of the pad contact surface 102 is positioned at that angular location, forward of and slightly below the leading side of the stub shaft 26 as shown in FIG. 3A. This may be described as a 4 o'clock position. Surface 102 of pad 100 is spherically convex shaped about bearing focal point 42. Surface 104 of collar 52 is spherically concave shaped also about focal point 42. It is important that the contact surface of collar 52 and pad 100 mate closely and provide as full area contact as possible for distribution of load, rather than line or point contact only. With mating surfaces generated from focal point 42 it is also possible to avoid adverse flap or pitch coupling.

As described earlier relative to FIG. 5, when the rotor brake is applied to slow and stop the blade for shut-down or subsequent blade folding, its inertia force will result in the blade leading ahead of the rotor hub until the damper bottoms. At this instant the blade will normally be in a predictable angular orientation with its hub arm, the droop stop will be rotated into its static position and contacted by the blade collar. The inwardly directed reaction load generated when the damper bottoms will drive the inboard spherical facing surface of the collar into the hub mounted spherical load reaction pad, and further inward motion of the blade will be physically prevented.

When all blades come to a full stop all dynamic loads will be removed from the rotor components, and the blade supporting elastomeric bearings will be required to react only the small compressive loads of the extended blade due to its static weight.

Having thus described typical embodiments of our invention, that which we claim as new and desire to secure by Letters Patent of the Unites States is:

1. A helicopter rotor comprising:
   (A) a hub mounted for rotation about an axis of rotation,
   (B) at least one blade projecting radially from said hub,
   (C) a spherical elastomeric bearing having a focal point and supporting said blade from said hub for universal motion about said focal point to thereby accommodate both blade lead-lag motion and blade flapping motion with respect to said hub and so that rotation of the blade with said hub generates centrifugal force which causes a radially outward motion of the blade to thereby exert a compressive load on the elastomeric bearing,
   (D) a lead-lag damper comprising a cylinder-piston mechanism extending substantially parallel to said blade and connected at its opposite ends to said blade and said hub to resist lead-lag motion of said blade and including first restraint means to limit piston motion within the cylinder to thereby limit blade lead motion with respect to said hub,
   (E) brake means operatively associated with said hub to reduce the speed thereof and hence cause said blade to move in lead motion until said first restraint means comes into operation to limit blade lead motion and thereby impose a force on the blade tending to cause a radial inward motion of the blade to thereby exert a tension load on said bearing in opposition to said compressive load, and
   (F) normally inoperative means to limit the inward motion of said blade as a result of actuation of said brake means to thereby prevent or limit tension loading of said bearing comprising second restraint means brought into operation by said radially inward motion of said blade resulting from the operation of said brake means and including a collar rotatably mounted on the inboard end of said blade and having a spherical contact surface coincident with the focal point of the spherical elastomeric bearing, and a contact pad having a spherical contact surface coincident with the focal point of the spherical elastomeric bearing and fixedly attached in a selected position to the hub so that said radial inward motion of said blade resulting from the actuation of said brake means and the operation of the first restraint means will bring said spherical contact surfaces into contact to limit said radial inward motion of the blade and hence the tension loading of said bearing.

2. A helicopter rotor as claimed in claim 1 wherein said hub has a hub arm to which said blade is attached by said spherical bearing and also wherein said pad consists of a small portion of a full circular ring located approximately in the four o'clock position on the outer face of the hub arm.

* * * * *